United States Patent [19]
Morita

[11] Patent Number: 4,763,235
[45] Date of Patent: Aug. 9, 1988

[54] DC-DC CONVERTER

[75] Inventor: Koichi Morita, Fujimi, Japan

[73] Assignee: Sanken Electric Co., Ltd., Saitama, Japan

[21] Appl. No.: 4,345

[22] Filed: Jan. 15, 1987

[30] Foreign Application Priority Data

Jan. 16, 1986 [JP] Japan ............................. 61-6669

[51] Int. Cl.$^4$ ........................................ H02M 3/335
[52] U.S. Cl. .................................. 363/19; 363/97
[58] Field of Search .............................. 363/19–21, 363/56, 97, 131; 323/289; 331/112

[56] References Cited

FOREIGN PATENT DOCUMENTS

| 49-73615 | 7/1974 | Japan . |  |
|---|---|---|---|
| 0025375 | 3/1981 | Japan | 363/19 |
| 58-25581 | 2/1983 | Japan . |  |
| 0116070 | 7/1983 | Japan | 363/19 |
| 0059078 | 4/1984 | Japan | 363/19 |
| 59-148563 | 8/1984 | Japan . |  |

OTHER PUBLICATIONS

Boschert, "Flyback Converters: Solid-State Solution to Low-Cost Switching Power Supplies", Electronics, vol. 51, No. 26, Dec. 21, 1978, pp. 100–104.

Primary Examiner—Peter S. Wong
Attorney, Agent, or Firm—Woodcock Washburn Kurtz Mackiewicz & Norris

[57] ABSTRACT

A DC-DC converter for supplying DC power to a load comprises a transformer, a switch, a current detector, a bias voltage adjusting circuit, and a control element for the OFF control of the switch. The transformer has primary and secondary windings for supplying power to the load and also a tertiary winding for driving the switch. The control element is controlled by sum of the variable bias voltage obtained from the bias voltage adjusting circuit and the current detection voltage obtained from the current detector. The switch is converted from the ON state into the OFF state when the control element is turned on.

6 Claims, 8 Drawing Sheets

DC-DC CONVERTER

BACKGROUND OF THE INVENTION

The present invention relates to a DC-DC converter for supplying DC power to a load, and more specifically to a switching regulator for supplying regulated voltage to a load.

A typical switching regulator as disclosed in Japanese Laid Open Utility Model Application No. 58-25581 for example, comprises a primary winding of a transformer connected to a DC power source, a switching transistor connected in series to the primary winding, a secondary winding of the transformer, a rectifying and smoothing circuit connected between the secondary winding and a load, an error amplifier for comparing output voltage of the rectifying and smoothing circuit with reference voltage, a triangular wave generator, a comparator for comparing the triangular wave with the error output and forming PWM (pulse width modulation) signal, and a drive circuit connected to the comparator and the switching transistor. The DC-DC converter of PWM type is advantageous in that the switching transistor can be turned on or off stably at constant frequency, whereas it is disadvantageous in that since the triangular generator, the comparator and the drive circuit are required the cost becomes high.

Another typical switching regulator as disclosed in Japanese Laid Open Patent Application No. 59-148563 for example, comprises a primary winding of a transformer connected to a DC power source, a switching transistor connected in series to the primary winding, a secondary winding of the transformer, a rectifying and smoothing circuit connected between the secondary winding and a load, a tertiary winding connected between base and emitter of the switching transistor and coupled in electromagnetic coupling with the primary winding so as to drive the switching transistor, and a voltage control means. The switching transistor of the DC-DC converter having the tertiary winding is driven by positive feedback voltage obtained at the tertiary winding. Consequently, the circuit constitution of the DC-DC converter is simplified. In the DC-DC converter of positive feedback type, assuming that collector current of the switching transistor is $I_c$, base current is $I_B$ and current amplification factor is $h_{FE}$, when the collector current $I_c$ increases gradually and becomes $I_c = I_B \times h_{FE}$, the switching transistor is turned off. The output voltage is adjusted by varying amount of the base current $I_B$. For example, if the base current is decreased, the ON time width of the switching transistor is narrowed and the output voltage is lowered. The base current is adjusted by bypassing a part of the base current supplied from the tertiary winding to the switching transistor. Consequently, the bypassed current produces power loss. Further in the DC-DC converter of positive feedback type, when required power of the load is small (at light load), not only the ON time width of the transistor but also the OFF time width are narrowed thereby the ON/OFF repetition frequency of the switching transistor becomes high. As a result, the number of turning-on and turning-off per unit time of the switching transistor is increased thereby ratio of the power loss based on the switching to the total power loss is increased.

Japanese Laid Open Patent Application No. 49-73615 discloses a DC-DC converter which comprises a primary winding of a transformer connected to a DC power source, a switching transistor connected in series to the primary winding, a secondary winding of the transformer, a rectifying and smoothing circuit connected between the secondary winding and a load, a tertiary winding connected between base and emitter of the switching transistor and coupled in electromagnetic coupling with the primary winding so as to drive the switching transistor, a quartic winding coupled in electromagnetic coupling with the primary winding so as to control magnetic flux of the transformer, a switch for shortcircuiting quartic winding selectively. In the DC-DC converter having the quartic winding, if the time width for shortcircuiting the quartic winding is varied, time until the magnetic flux is returned to zero, i.e., reset time is varied. As a result, the OFF time width of the switching transistor is varied. In the DC-DC converter, however, the quartic winding and the short-circuit control circuit therefor are required thereby reduction of the cost becomes difficult.

SUMMARY OF THE INVENTION

An object of the invention is to provide a DC-DC converter wherein circuit constitution is simple and power loss is little.

Another object of the invention is to provide a DC-DC converter wherein even if DC output current, i.e., load current varies, the ON/OFF period of the switch is not significantly varied.

A DC-DC converter of the invention to attain the above objects comprises a pair of input terminals, a transformer, a switch, means for converting the switch into the ON state, a current detecting means, a DC voltage source for controlling the switch, a bias voltage adjusting means, and a control means. The transformer has a main winding, an auxiliary winding and a voltage output means. The main winding is connected in series to the switch. The auxiliary winding is connected to a control terminal of the switch so as to give positive feedback voltage to the switch. The rectifying and smoothing circuit is connected between the voltage output means and a load. The current detecting means is connected in series to the switch so as to detect current flowing through the switch. Since the transformer has inductance, the current flowing through the switch increases gradually. The control means converts the switch from the ON state into the OFF state in response to sum of the bias voltage given from the bias voltage adjusting means and the current detection voltage given from the current detecting means.

The above and other objects, features and advantages of this invention and the manner of attaining them will become more apparent, and the invention itself will best be understood, from a study of the following description of preferred embodiments illustrated in the attached drawings.

BRIEF DESCRIPTION OF THE DRAWINGS

FIG. 6 is modified;

DESCRIPTION OF PREFERRED EMBODIMENTS

Figure 1:
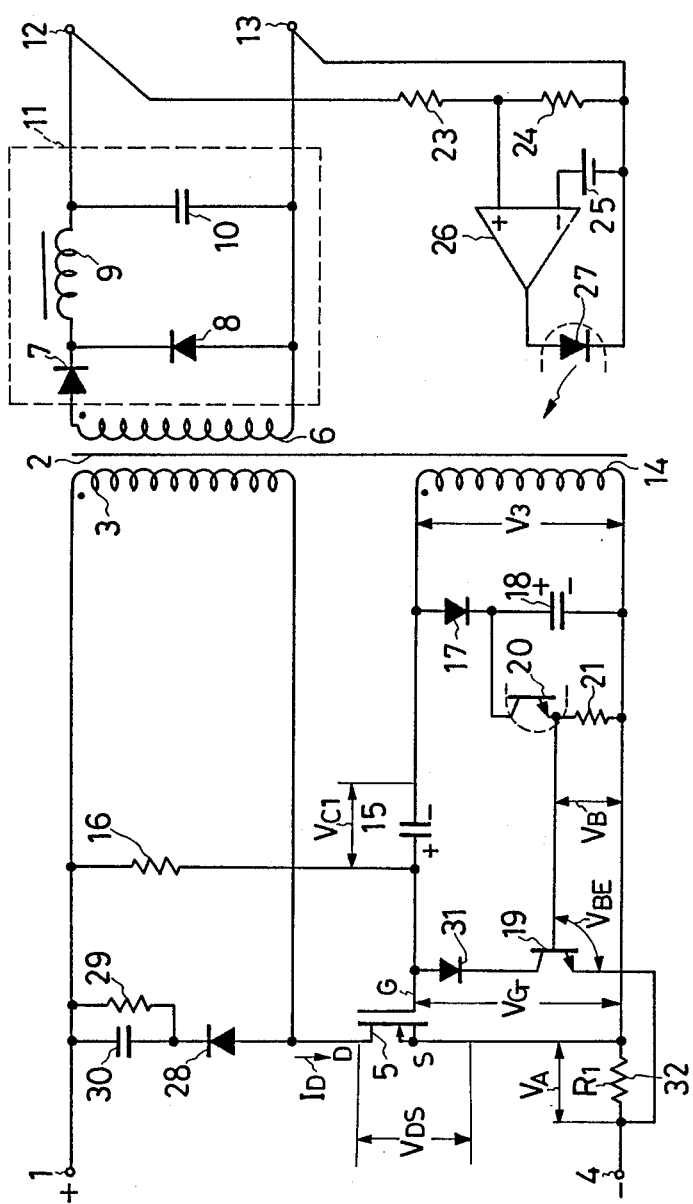
FIG. 1 is a circuit diagram of a DC-DC converter as a first embodiment of the invention.

FIG. 1 shows a DC-DC converter as a first embodiment of the invention. A primary winding 3 of a transformer 2 is connected between one input terminal 1 and other input terminal 4 for connection to a DC power source (not shown). N-channel MOS type field effect transistor (FET) 5 is connected in series to the primary winding 3 for voltage conversion. The FET 5 comprises drain connected to the primary winding 3, source connected to other input terminal 4, and gate to control the ON/OFF state between source and drain. Since the FET 5 has the threshold voltage $V_{TH}$, when voltage beyond the threshold voltage $V_{TH}$ is applied between gate and source the FET 5 is converted from the OFF state into the ON state.

In order to obtain output voltage corresponding to voltage or energy of the primary winding 3, a secondary winding 6 is coupled in electromagnetic coupling with the primary winding 3. A rectifying and smoothing circuit 11 connected between the secondary winding 6 and a pair of DC output terminals 12, 13 to connect a load (not shown), comprises two diodes 7, 8, a reactor 9 and a capacitor 10. A tertiary winding 14 coupled in electromagnetic coupling with the primary winding 3 is connected between gate and source so as to drive the FET 5.

A first capacitor 15 for converting the FET 5 from the OFF state into the ON state is connected between the tertiary winding 14 and gate of the FET 5. A first resistor 16 for charging the first capacitor 15 is connected between one input terminal 1 and the first capacitor 15.

A second capacitor 18 having function as a DC power source is connected in parallel to the tertiary winding 14 through a diode 17. A second resistor 21 is connected in parallel to the second capacitor 18 through a photo transistor 20. Since the photo transistor 20 has function as a variable resistor, the photo transistor 20 and the resistor 21 constitute a variable voltage dividing circuit. Variable bias voltage $V_B$ can be obtained across the resistor 21 of the variable voltage dividing circuit.

A current detecting resistor 32 is connected in series to the FET 5, and current detection voltage $V_A$ is produced across the current detecting resistor 32 by its resistance value $R_i$ and the drain current $I_D$ flowing through it. One end of the current detecting resistor 32 is connected to source of the FET 5, and other end thereof is connected to the input terminal 4.

A control transistor 19 for converting the FET 5 from the ON state into the OFF state comprises collector, emitter and base. Collector of the control transistor 19 is connected to gate of the FET 5 through a diode 31 to inhibit the reverse current. Emitter of the transistor 19 is connected to other end of the current detecting resistor 32. Base of the transistor 19 is connected to one end of the second resistor 21. Since other end of the second resistor 21 is connected to one end of the current detecting resistor 32, series circuit of the second resistor 21 and the current detecting resistor 32 is connected between base and emitter of the transistor 19.

In order to detect voltage between the pair of output terminals 12, 13, two resistors 23, 24 are connected between the pair of output terminals 12, 13. An error amplifier 26 has one input terminal connected to the voltage dividing point of the two resistors 23, 24, other input terminal connected to a reference voltage source 25, and an output terminal connected to a light emitting diode 27. The light emitting diode 27 emits light in response to output obtained from the error amplifier 26. The light emitting diode 27 is in photo-coupling with the photo transistor 20.

In order to reset residual magnetism of the transformer 2 by flyback voltage, a resistor 29 is connected in parallel to the primary winding 3 through a diode 28. In order to suppress the flyback voltage, a capacitor 30 is connected in parallel to the resistor 29.

Figure 2:
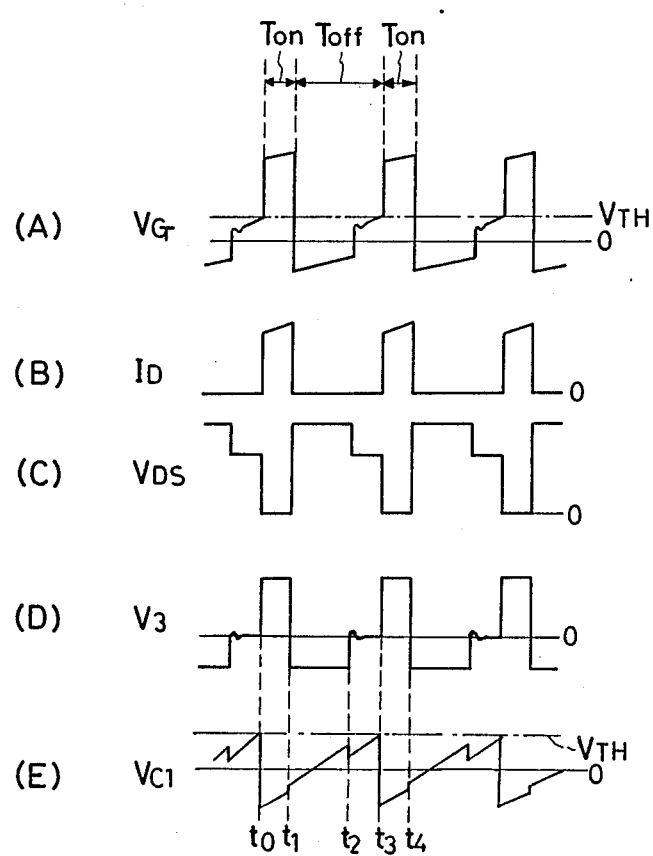
FIG. 2 is a waveform chart of the DC-DC converter in FIG. 1 illustrating gate voltage $V_G$, drain current $I_D$, drain-source voltage $V_{DS}$, tertiary winding voltage $V_3$ and first capacitor voltage $V_{cf}$.

The DC-DC converter of FIG. 1 acts as shown in voltage and current waveforms of FIG. 2. When DC voltage is applied to the pair of input terminals 1, 4, the charging current of the first capacitor 15 flows through the circuit composed of one input terminal 1, the first resistor 16, the first capacitor 15, the tertiary winding 14, the current detecting resistor 32 and other input terminal 4. Since the first capacitor 15 is charged with time constant, voltage $V_{cl}$ of the first capacitor 15 increases slantwise as shown in FIG. 2(E). Since the voltage $V_{cl}$ of the first capacitor 15 is applied between gate and source of the FET 5, when the voltage $V_{cl}$ attains to the threshold voltage $V_{TH}$ of the FET 5, the FET 5 is converted from the OFF state into the ON state. During the ON period $T_{on}$ of the FET 5, most of the input voltage supplied between the pair of input terminals 1, 4 is applied to the primary winding 3. As a result, positive feedback voltage $V_3$ as shown in FIG. 2(D) is generated at the tertiary winding 14. Since the tertiary winding 14 is connected in series to the first capacitor 15, gate voltage $V_G$ of FIG. 2(A) corresponding to sum of the voltage $V_3$ of the tertiary winding 14 and the voltage $V_{cl}$ of the first capacitor 15 is applied between gate and source of the FET 5. As a result, the FET 5 is rendered conductive sufficiently. Current flows through capacitance between source and gate of the FET 5 based on the foward voltage bbtained at the tertiary winding 14. As a result, the foward voltage of the tertiary winding 14 allows discharge of the first capacitor 15 and then charges the first capacitor 15 to the reverse polarity. Since the primary winding 3 has inductance, the drain current $I_D$ increases slantwise as shown in FIG. 2(B). Since voltage corresponding to the voltage of the primary winding 3 is induced at the secondary winding 6 during the ON period of the FET 5, DC output voltage corresponding to the voltage of the secondary winding 6 is obtained at output stage of the rectifying and smoothing circuit 11.

The voltage $V_3$ of the tertiary winding 14 during the ON period $T_{on}$ of the FET 5 serves also as power source to charge the second capacitor 18. Since the second capacitor 18 is connected to the tertiary winding 14 through the diode 17, it is charged only in the positive direction and outputs the DC voltage whose level varies little. The bias voltage $V_B$ in FIG. 3(C) obtained between both ends of the resistor 21 varies corresponding to the variation of the resistance value of the photo transistor 20. The bias voltage $V_B$ is set to level where it is unable to turn on the transistor 19 for itself.

The transistor 19 is converted from the OFF state into the ON state when base . emitter voltage $V_{BE}$ becomes higher than the threshold voltage of about 0.6V. The voltage $V_{BE}$ in FIG. 3(D) corresponding to sum of the current detection voltage $V_A$ in FIG. 3(B) and the bias voltage $V_B$ in FIG. 3(C) is applied between base and emitter of the transistor 19. Since the primary winding 3 connected in series to the FET 5 has inductance, the drain current $I_D$ increases slantwise as shown in FIG. 3(A). The current detecting resistor 32 and the second resistor 21 are set to small value so that the base . emitter voltage $V_{BE}$ does not attain to 0.6V immediately after the FET 5 is converted from the ON state into the OFF state. If the transistor 19 is turned on, since the transistor 19 and the current detecting resistor 32 shortcircuit between gate and emitter of the FET 5, the gate voltage $V_G$ becomes lower than the threshold voltage $V_{TH}$ and the FET 5 is turned off. While the ON state of the transitor 19 is kept for the storage time, the charge of the capacitor 15 is charged through the circuit composed of the diode 31, the transistor 19, the resistor 32 and the tertiary winding 14. If the FET 5 is turned off, the reset operation of the transformer 2 is executed. As a result, the reverse voltage as shown in FIG. 2(D) is generated at the tertiary winding 14. Since sum of the voltage of the capacitor 15 and the reverse voltage of the tertiary winding 14 is significantly lower than the threshold voltage $V_{TH}$ of the FET 5, the FET 5 is held to the OFF state. And then, if the reverse voltage of the tertiary winding 14 is not generated and the voltage $V_{c1}$ of the first capacitor 15 becomes higher than the threshold voltage $V_{TH}$, the FET 5 is turned on again.

Figure 3:
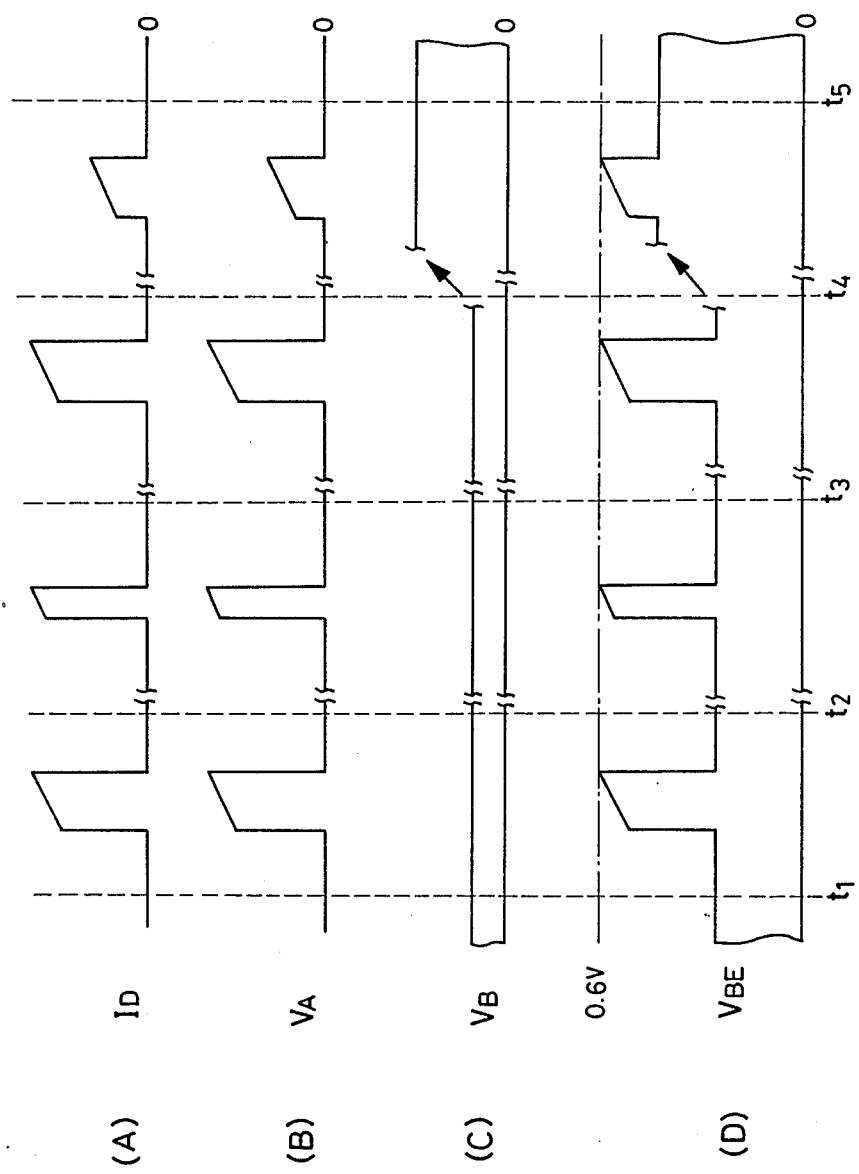
FIG. 3 is a waveform chart of the DC-DC converter in FIG. 1 illustrating drain current ID, current detection voltage $V_A$, bias voltage $V_B$ and base-emitter voltage $V_{BE}$.

The turning point of the FET 5 from the ON state into the OFF state varies depending on the current detection voltage $V_A$ and the bias voltage $V_B$. In FIG. 3, various waveforms are shown during the period $t_1 \sim t_2$ where the input voltage (power source voltage) is low, the period $t_2 \sim t_3$ where the input voltage is high, the period $t_3 \sim t_4$ where the drain current (load current) is large, and the period $t_4 \sim t_5$ where the drain current is small. If the input voltage is low during the period $t_1 \sim t_2$, the drain current $I_D$ and the current detection voltage $V_A$ also become small at the ON starting, and it takes a comparatively long time until the $V_{BE}$ attains to 0.6V as shown in FIG. 3(D) thereby the ON time width becomes long.

If the input voltage is high during the period $t_2 \sim t_3$, the current detection voltage $V_A$ becomes high at the ON starting thereby the time of the $V_{BE}$ attaining to 0.6V becomes short.

If the drain current $I_D$ is large during the period $t_3 \sim t_4$, the voltage between the output terminals 12, 13 is apt to drop, thereby the error output and the light quantity of the light emitting diode 27 decrease and the resistance value of the photo transistor 20 becomes large, resulting in lowering of the bias voltage $V_B$ obtained from the voltage dividing circuit of the photo transistor 20 and the resistor 21. Consequently, even if the drain current $I_D$ is large, the time of the $V_{BE}$ of the transistor 19 attaining to 0.6V becomes long thereby the necessary ON time width is obtained.

If the drain current is small during the period $t_4 \sim t_5$, the output voltage is apt to rise, thereby the error output and the light quantity of the light emitting diode 27 increase and the resistance value of the photo transistor 20 becomes small, resulting in rise of the bias voltage $V_B$ as shown in FIG. 3(C). Consequently, even if the amplitude of the drain current $I_D$ is small, the $V_{BE}$ attains to 0.6V comparatively rapidly as shown in FIG. 3(D).

If it is assumed that the voltage between the output terminals 12, 13 becomes lower than desired value, the output voltage of the error amplifier 26 becomes low and the light quantity of the light emitting diode 27 also becomes low. As a result, resistance value of the photo transistor 20 becomes high, and the voltage $V_B$ across the resistor 21 becomes low. Since the transistor 19 is driven by sum of the bias voltage $V_B$ and the current detection voltage $V_A$, when the bias voltage $V_B$ is low, it is possible that the current detection voltage $V_A$ becomes high. As a result, the ON time width $T_{on}$ of the FET 5 becomes wide, and the DC output voltage rises to approach the required value. When the DC output voltage is higher than the desired value, reverse operation to the above description regarding the lower voltage is effected.

As clearly understood from the above description, the DC-DC converter in FIG. 1 has advantages as follows:

(1) Conversion time of the FET 5 from the OFF state into the ON state is determined by the charging voltage $V_{c1}$ of the first capacitor 15, and conversion time from the ON state into the OFF state is determined by sum of the bias voltage $V_B$ and the current detection voltage $V_A$. Consequently, the ON/OFF period ($T_{on}+T_{off}$) of the FET 5 is not varied significantly corresponding to variation of the input voltage and variation of the load current. When the load current is small, the switching number per unit time of the FET 5 decreases and ratio of the power loss of the FET 5 by the switching to the total power loss decreases.

(2) The transistor 19 is turned on instantaneously at the conversion of the FET 5 from the ON state into the OFF state, and rendered off at other period. Consequently, the power loss in the transistor 19 is little.

(3) Since the triangular wave generator and the voltage comparator are not used, the circuit constitution is simplified.

(4) The FET 5 is protected from overcurrent by the circuit to perform the ON/OFF control of the FET 5.

Figure 4:
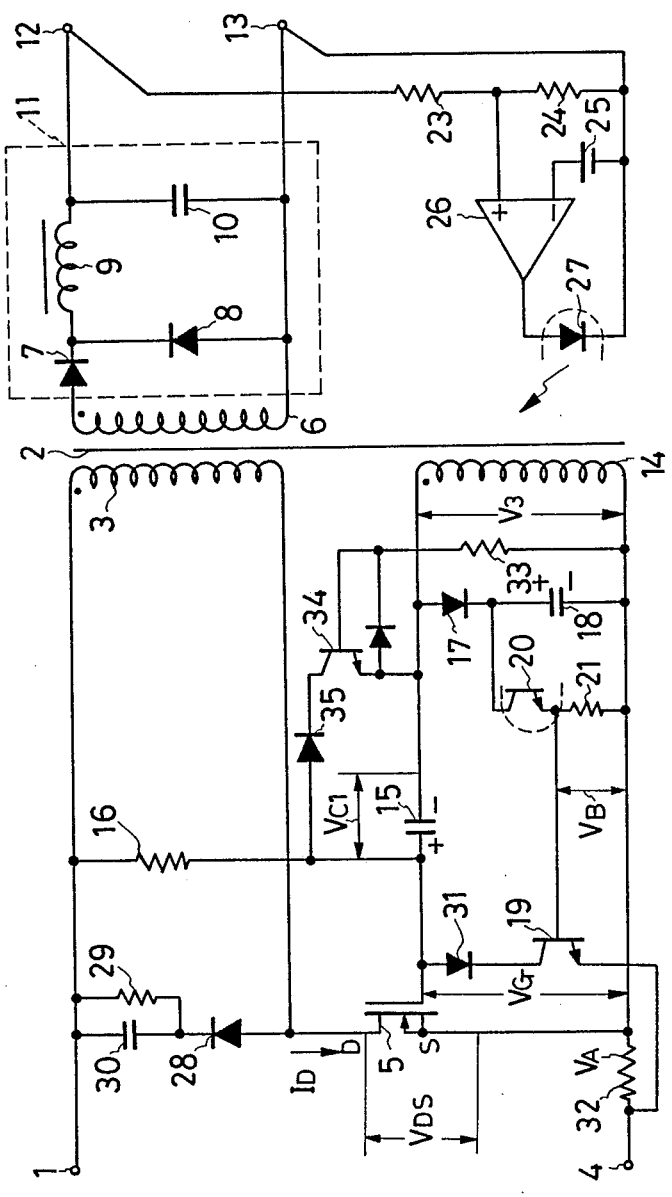
FIG. 4 is a circuit diagram of a DC-DC converter as a second embodiment of the invention.

FIG. 4 shows a DC-DC converter as a second embodiment of the invention. Many parts in FIG. 4 are coincident to that in FIG. 1. Consequently, parts in FIG. 4 corresponding to that in FIG. 1 are designated by the same reference numerals. The DC-DC converter in FIG. 4 further comprises a resistor 33, a transistor 34 and a diode 35. The transistor 34 is connected in parallel to the first capacitor 15 through the diode 35. Emitter of the transistor 34 is connected to one end of the tertiary winding 14, and base thereof is connected to other end of the tertiary winding 14 through the resistor 33. The transistor 34 performs the ON/OFF operation periodically in response to the voltage of the tertiary winding 14. When the reverse voltage is generated at the tertiary winding 14 based on the reset operation of the transformer, the transistor 34 is turned on. As a result, the discharging current of the first capacitor 15 flows through the transistor 34. Charge of the first capacitor 15 is started after the reset operation of the transformer 2 is finished. Consequently, attaining of the voltage $V_{cl}$ of the first capacitor 15 to the threshold voltage $V_{TH}$ is entirely inhibited before the reset of the transformer 2 is finished.

When the reset of the transformer 2 is finished, oscillating voltage is generated at respective windings 3, 6 and 14. If the oscillating voltage of large level in the positive direction is generated at the tertiary winding 14, the FET 5 in response to the oscillating voltage may be turned on. However, since the DC-DC converter of FIG. 4 has the first capacitor 15 and the transistor 34, the FET 5 is not turned on due to the oscillating voltage. Since the first capacitor 15 is shortcircuited by the transistor 34 immediately before the generation of the oscillating voltage, the voltage of the first capacitor 15 during the generation of the oscillating voltage is quite small and therefore sum of the voltage $V_{cl}$ of the first capacitor 15 and the oscillating voltage of the tertiary winding 14 does not attain to the threshold voltage of the FET 5.

Figure 5:
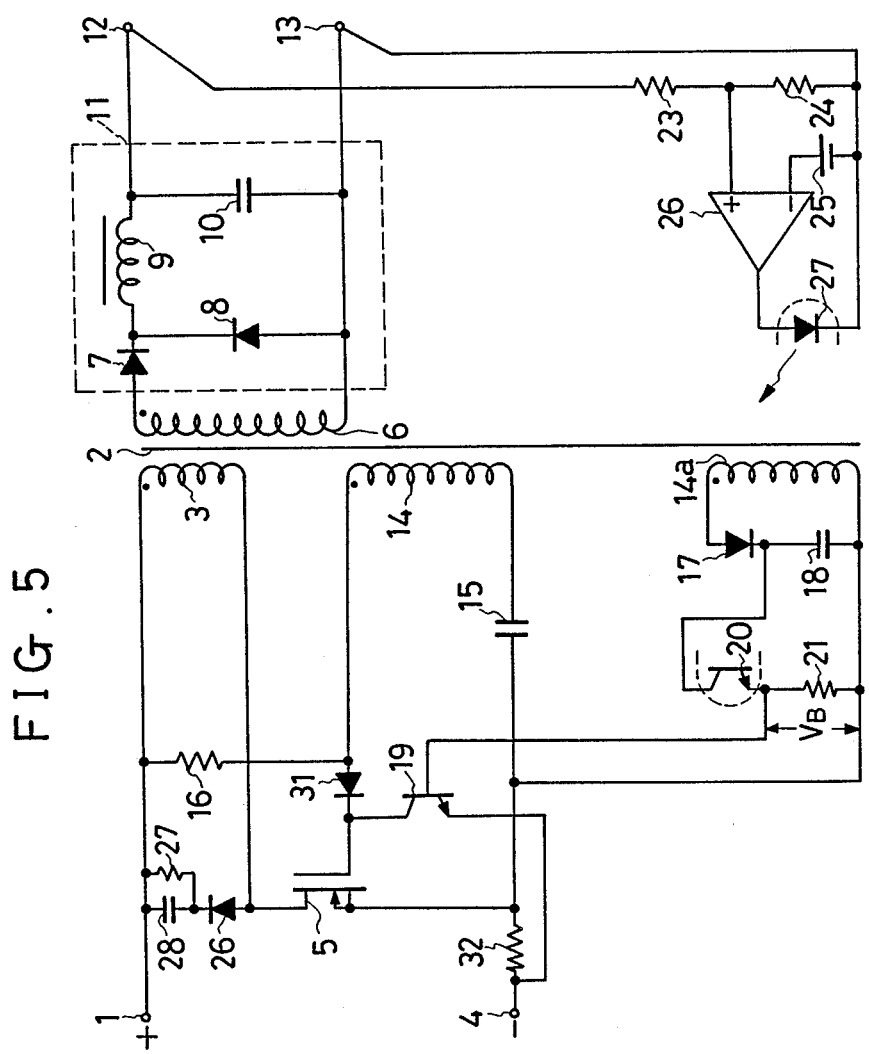
FIG. 5 is a circuit diagram of a DC-DC converter as a third embodiment of the invention.

FIG. 5 shows a DC-DC converter as a third embodiment of the invention. In FIG. 5, parts corresponding to that in FIG. 1 are designated by the same reference numerals. In FIG. 5, the first capacitor 15 is connected between the tertiary winding 14 and source of the FET 5. Even when the connection position of the first capacitor 15 is changed as above described, the first capacitor 15 acts in similar manner to that in FIG. 1 or FIG. 4. The transformer 2 in FIG. 5 has a quartic winding 14a. The power source capacitor 18 is connected to the quartic winding 14a through the diode 17.

Figure 6:
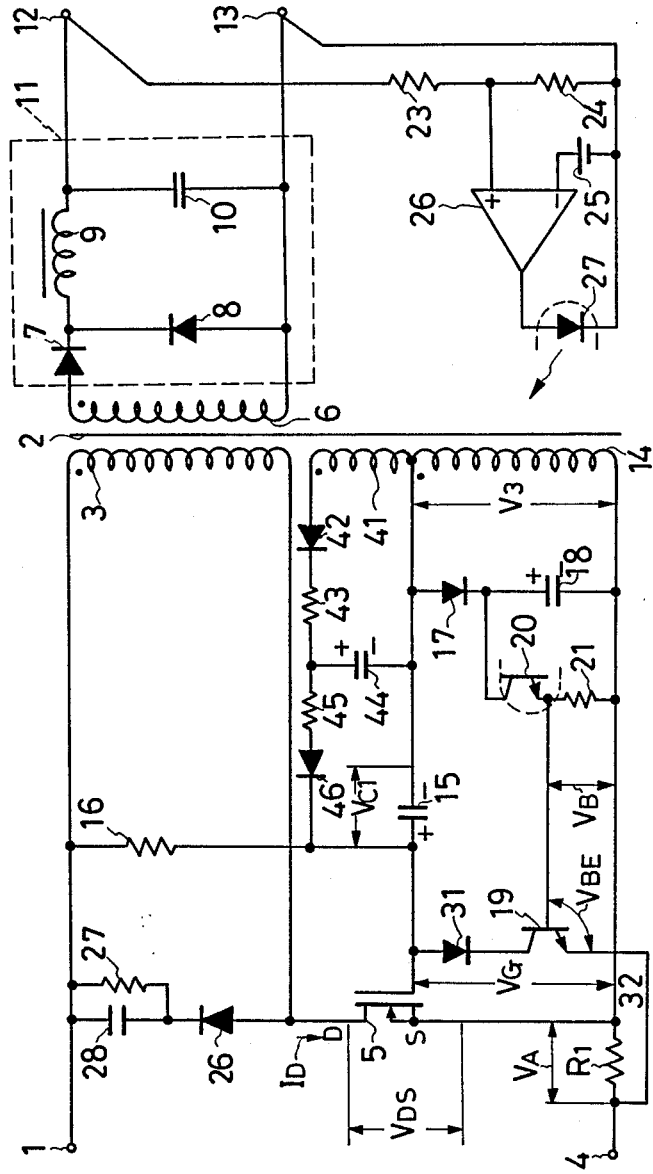
FIG. 6 is a circuit diagram of a DC-DC converter as a fourth embodiment of the invention.

FIG. 6 shows a DC-DC converter as a fourth embodiment of the invention. In FIG. 6, parts corresponding to that in FIG. 1 are designated by the same reference numerals. The DC-DC converter of FIG. 6 has the main charging circuit comprising the resistor 16 and also an auxiliary charging circuit. The auxiliary charging circuit comprises a quartic winding 41 coupled in electromagnetic coupling with the primary winding 3, a power source capacitor 44 connected in parallel to the quartic winding 14 through a diode 42 and a resistor 43, and a resistor 45 and a diode 46 for connecting the power source capacitor 44 to the first capacitor 15. The first capacitor 15 is charged by current flowing through the resistor 16 and also by current flowing through the resistor 45 and the diode 46 based on the power source capacitor 44. Consequently, the current flowing through the resistor 16 may be set to small value thereby the power loss in the resistor 16 is decreased. The auxiliary charging circuit comprising the quartic winding 41 and the capacitor 44 as shown in FIG. 6 can be connected to the DC-DC converter in FIG. 1, FIG. 4 and FIG. 5.

Figure 7:
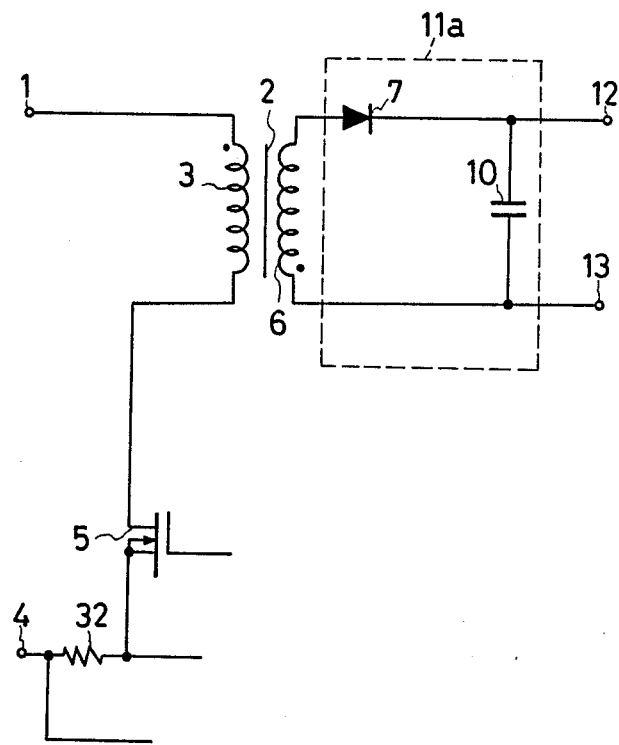
FIG. 7 is a circuit diagram of a part of a DC-DC converter where the transformer and the rectifying and smoothing circuit shown in FIG. 1, FIG. 4, FIG. 5 or FIG. 6 are modified.

The preferred embodiments disclosed herein are meant purely to illustrate or explain and not to impose limitations upon the invention, as a variety of modifications will readily occur to the specialists on the basis of this disclosure. The following is a brief list of such possible modifications:

(1) As shown in FIG. 7, the polarity of the secondary winding may be reversed to that in FIG. 1, FIG. 4, FIG. 5 or FIG. 6. The rectifying and smoothing circuit 11a in this case comprises the diode 7 and the capacitor 10. The diode 7 is turned off during the ON period of the FET 5, and turned on during the OFF period of the FET 5. Consequently, the energy stored in the transformer 2 during the ON period of the FET 5 is discharged through the diode 7 during the OFF period of the FET 5.

Figure 8:
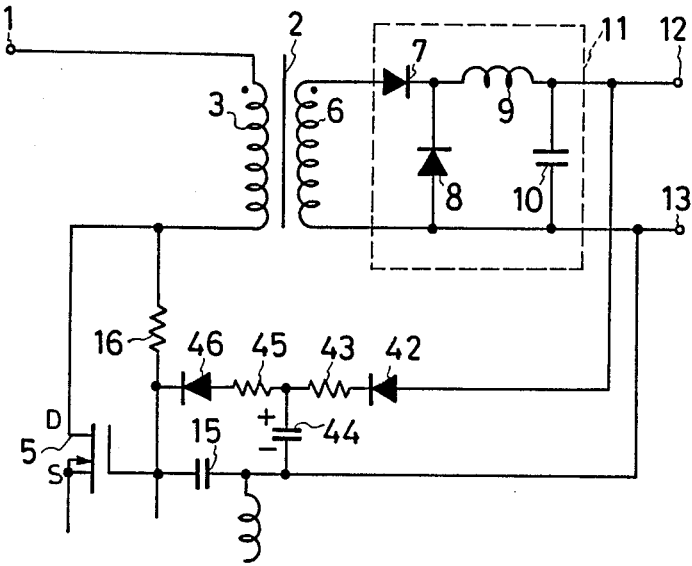
FIG. 8 is a circuit diagram of a part of a DC-DC converter where the charging circuit of the first capacitor shown in FIG. 1, FIG. 4, FIG. 5

(2) The auxiliary charging circuit for the first capacitor 15 may be constituted as shown in FIG. 8. The auxiliary charging circuit in FIG. 8 comprises the capacitor 44 connected between the output terminals 12, 13 through the diode 42 and the resistor 43, and the resistor 45 and the diode 46 to connect the capacitor 44 to the first capacitor 15. One end of the resistor 16 is connected between the primary winding 3 and the FET 5.

Figure 9:
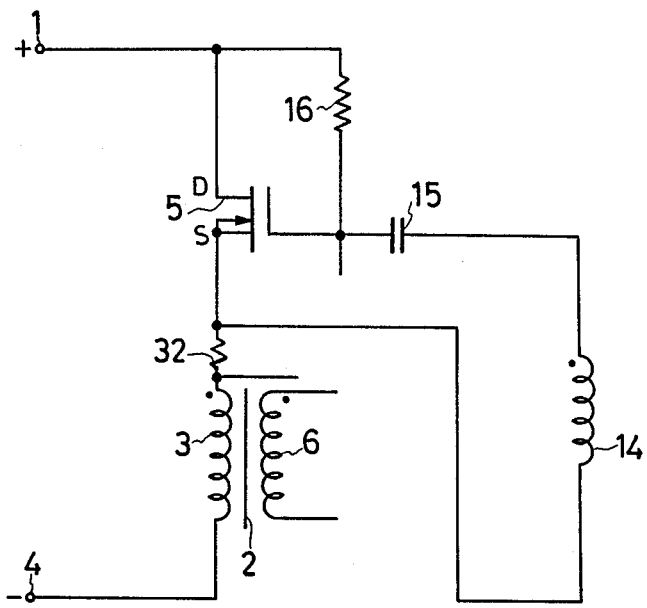
FIG. 9 is a circuit diagram of a part of a DC-DC converter in modification where a transformer is connected to source of a field effect transistor.

(3) As shown in FIG. 9, the transformer 2 may be connected between source of the FET 5 and other input terminal 4.

Figure 10:
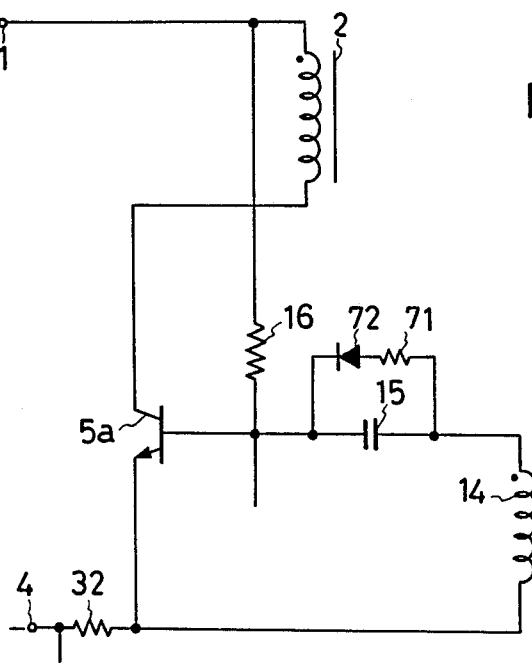
FIG. 10 is a circuit diagram of a part of a DC-DC converter where a bipolar transistor is used in place of the field effect transistor.

(4) As shown in FIG. 10, a bipolar transistor 5a may be used in place of the FET 5 in FIG. 1, FIG. 4, FIG. 5 or FIG. 6. In FIG. 10, the tertiary winding 14 is connected between base and emitter of the transistor 5a through the first capacitor 15. A resistor 71 is connected in parallel to the first capacitor 15 through a diode 72. Base current supplied to the transistor 5a based on the tertiary winding 14 flows through the resistor 71 and the diode 72.

Figure 11:
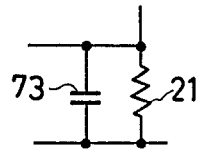
FIG. 11 is a circuit diagram of a part of a DC-DC converter in modification of FIG. 1, FIG. 4, FIG. 5 or FIG. 6.

(5) As shown in FIG. 11, a capacitor 73 for bias voltage stabilizing may be connected in parallel to the resistor 21 in FIG. 1, FIG. 4, FIG. 5 or FIG. 6.

(6) In place of the FET 5 in FIG. 1, FIG. 4, FIG. 5 or FIG. 6, a photo transistor may be connected between the primary winding 3 and the power source terminal 4, and may be controlled by a light emitting diode. In this case, the light emitting diode is controlled based on the first capacitor 15.

(7) The transistor 19 may be made FET.

(8) The transformer 2 may be made auto-transformer.

What is claimed is:

1. A DC-DC converter for supplying DC power to a load, comprising:
(a) a pair of DC supply terminals;
(b) a field effect transistor connected between the pair of DC supply terminals and having drain, source and gate;
(c) a transformer having a primary winding connected in series with the field effect transistor, a secondary winding, and a tertiary winding having a first extremity connected to the gate of the field effect transistor and a second extremity connected to the source of the field effect transistor;
(d) a rectifying and smoothing circuit connected between the secondary winding and the load;
(e) a capacitor connected in series to the tertiary winding;
(f) means for charging the capacitor;
(g) a current detecting resistor having a first extremity connected to one of the DC supply terminals and a second extemity connected to both the source of the field effect transistor and the second extremity of the tertiary winding of the transformer, said current detecting resistor providing a current detecting voltage;

(h) a source of DC voltage;

(i) a variable voltage dividing circuit connected across the DC voltage source, said variable voltage dividing circuit having a pair of output lines for providing a variable fraction of the DC voltage, one of the output lines being connected to the second extremity of the current detecting resistor; and (j) a switching element having a first main electrode connected to the gate of the field effect transistor, a second main electrode connected to the first extremity of the current detecting resistor, and a control electrode connected to the other of the output lines of the variable voltage dividing circuit, the switching element being turned ON when the sum of the current detection voltage and the variable fraction of the DC voltage becomes higher than a prescribed value.

2. A DC-DC converter as set forth in claim 1, further comprising:

(a) a voltage detecting means connected to the rectifying and smoothing circuit for obtaining detection voltage corresponding to the DC output voltage;

(b) means for generating reference voltage;

(c) an error amplifier connected to the voltage detecting means and the reference voltage generating means for obtaining output corresponding to difference between the detection voltage and the reference voltage; and (d) means for controlling the variable voltage dividing circuit in response to output of the error amplifier.

3. A DC-DC converter as set forth in claim 1, further comprising a discharge control transistor connected in parallel with the capacitor, the discharge control transistor having an emitter connected to the first extremity of the tertiary winding of the transformer, and a base connected to the second extremity of the tertiary winding, the discharge control transistor becoming conductive in response to a voltage developed across the tertiary winding of the transformer when the field effect transistor is nonconductive.

4. A DC-DC converter as set forth in claim 1, further comprising:

(a) a quartic winding coupled in electromagnetic coupling with the primary winding; and (b) a rectifying and smoothing circuit connected between the quartic winding and the capacitor.

5. A DC-DC converter as set forrh in claim 1, wherein the DC voltage source means comprises a capacitor connected in parallel to the tertiary winding, and a diode connected between the capacitor and the tertiary winding.

6. A DC-DC converter as set forth in claim 1, wherein the variable voltage dividing circuit comprises a semiconductor control element, and a resistor connected in series to the semiconductor control element.

* * * * *